(12) United States Patent
Shin

(10) Patent No.: US 9,073,496 B2
(45) Date of Patent: Jul. 7, 2015

(54) HYBRID BUMPER BEAM FOR VEHICLE, MANUFACTURING METHOD THEREFOR AND BUMPER BEAM UNIT THEREOF

(71) Applicant: Hyundai Motor Company, Seoul (KR)

(72) Inventor: Joong Hyun Shin, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/143,975

(22) Filed: Dec. 30, 2013

(65) Prior Publication Data

US 2015/0015005 A1 Jan. 15, 2015

(30) Foreign Application Priority Data

Jul. 9, 2013 (KR) .................. 10-2013-0080398

(51) Int. Cl.
| | |
|---|---|
| *B60R 19/02* | (2006.01) |
| *B60R 19/03* | (2006.01) |
| *B29C 45/14* | (2006.01) |
| *B60R 19/24* | (2006.01) |
| *B60R 19/18* | (2006.01) |

(52) U.S. Cl.
CPC .......... *B60R 19/03* (2013.01); *B60R 2019/1813* (2013.01); *B29C 45/14631* (2013.01); *B60R 19/18* (2013.01); *B60R 19/24* (2013.01); *B60R 2019/1853* (2013.01); *B60R 2019/242* (2013.01)

(58) Field of Classification Search
CPC ...... B60R 19/02; B60R 19/023; B60R 19/03; B60R 19/18; B60R 19/1826; B60R 2019/1806; B60R 2019/1813; B62D 25/08; B62D 25/084; B62D 25/085

USPC .................. 293/120, 121, 122, 133, 146; 296/187.03, 187.09, 187.11, 203.02, 296/205

See application file for complete search history.

(56) References Cited

U.S. PATENT DOCUMENTS

| | | | | |
|---|---|---|---|---|
| 3,493,257 | A | * | 2/1970 | Fitzgerald et al. ............ 293/120 |
| 4,320,913 | A | * | 3/1982 | Kuroda ........................ 293/120 |
| 6,883,843 | B2 | * | 4/2005 | Van Damme et al. ........ 293/120 |
| 7,007,990 | B2 | * | 3/2006 | Van Damme et al. ........ 293/120 |
| 7,044,516 | B2 | | 5/2006 | Kobayashi et al. |
| 7,198,309 | B2 | * | 4/2007 | Reynolds ..................... 293/122 |
| 2003/0111852 | A1 | * | 6/2003 | Carley et al. ................. 293/109 |
| 2012/0306222 | A1 | * | 12/2012 | Choi et al. ................... 293/120 |

FOREIGN PATENT DOCUMENTS

| | | |
|---|---|---|
| JP | 2010-52729 A | 3/2010 |
| JP | 4423018 B2 | 3/2010 |
| KR | 97-61850 U | 12/1997 |
| KR | 1998-044735 U | 9/1998 |
| KR | 1998-045206 U | 9/1998 |
| KR | 10-1198621 B1 | 11/2012 |
| KR | 10-2013-0027684 A | 3/2013 |

\* cited by examiner

*Primary Examiner* — Jason S Daniels
(74) *Attorney, Agent, or Firm* — Morgan, Lewis & Bockius LLP

(57) ABSTRACT

A hybrid bumper beam for a vehicle includes a beam body formed of a resin group material, and a reinforcement injection molded with the beam body as one unit in a state the reinforcement is inserted in the beam body in a length direction of the beam body and opposing ends of the reinforcement are exposed to an outside of the beam body for fastening to stays, respectively.

9 Claims, 5 Drawing Sheets

HYBRID BUMPER BEAM FOR VEHICLE, MANUFACTURING METHOD THEREFOR AND BUMPER BEAM UNIT THEREOF

CROSS-REFERENCE TO RELATED APPLICATION

The present application claims priority of Korean Patent Application Number 10-2013-0080398 filed Jul. 9, 2013, the entire contents of which application is incorporated herein for all purposes by this reference.

BACKGROUND OF INVENTION

1. Field of Invention

The present invention relates to a bumper beam for a vehicle, a manufacturing method therefor and a bumper beam unit thereof. More particularly, the present invention relates to a bumper beam for a vehicle having fastening plates formed as one unit with two steel pipes and stays and injection molded with a resin group material as one unit in a hybrid mode; a manufacturing method therefor and a bumper beam unit thereof.

2. Description of Related Art

In general, the bumper in the vehicle is a damping device mounted to predetermined parts of a front and a rear of the vehicle for absorbing an impact of a crash when the vehicle crashes to another vehicle or a fixed body for devising safety of occupants as well as minimizing deformation of a vehicle body.

Referring to FIG. 1, the bumper 100 is provided with a bumper beam 101 disposed in a width direction of the vehicle at the front and the rear thereof, a stay 103 for connecting the bumper beam 101 to a side member 111 of the vehicle body, an energy absorber 107 disposed in front of the bumper beam 101 for absorbing the impact, and a bumper cover 109 for covering the bumper beam 101 and the energy absorber 107.

In this case, the bumper beam 101 is formed of a material, such as steel, aluminum, fiber reinforced plastic, for supporting the energy absorber and, at the same time with this, absorbing external impact energy as the bumper beam itself is deformed.

Recently, a system is introduced, in which a steel pipe is inserted in the bumper beam of steel for reinforcing crush stiffness of the bumper beam, additionally, which increases cost and vehicle weight resulting in conflict with fuel consumption saving of the vehicle.

Therefore, recently, as a scheme for making the vehicle lighter to improve the fuel consumption, a bumper beam is spot lighted, which is formed of a GMT (Glass Mat Reinforced Thermoplastics) material which is one of plastic materials.

The bumper beam of the GMT material has excellent physical properties enough to have an advantage in that damage to the vehicle can be minimized by absorbing the impact energy when the vehicle crashes.

The bumper beam of the GMT material is fabricated with steps of impregnating glass fiber on a polypropylene sheet, and impregnating a polypropylene sheet thereon again to form a resin sheet which is subjected to vacuum molding to obtain the bumper beam of GMT.

However, the bumper beam of GMT material has a drawback in that the beam is broken at a high speed crash exceeding a fatigue limit, and since the bumper beam of the GMT material is required to be thick on the whole for providing required rigidity and strength, the bumper beam of GMT material has a problem in that mounting space and weight reduction effects are not high substantially in comparison to a steel beam.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a bumper beam for a vehicle having advantages of improved fuel consumption by reducing whole weight of the beam while improving crashworthiness by making a reinforcement which is formed to be able to be fastened to stays and a beam body to be formed as one unit in a hybrid mode to enhance beam strength; a manufacturing method therefor and a bumper beam unit thereof.

Various aspects of the present invention provide for a hybrid bumper beam including a beam body formed of a resin group material, and a reinforcement injection molded with the beam body as one unit in a state the reinforcement is inserted in the beam body in a length direction of the beam body and both ends of the reinforcement are exposed to an outside of the beam body for fastening to stays, respectively.

And, the reinforcement may includes a plurality of steel pipes inserted in the beam body, and fastening plates coupled to the steel pipes at both ends thereof as one unit and exposed to a rear side of the beam body for fastening to the stays, respectively.

And, the beam body may be formed to have a fixed curvature in a length direction thereof, and the steel pipes may be formed in conformity with the curvature of the beam body.

And, the steel pipes may be two in number, and may be pressed down before inserted in a mold and may have tooling holes formed therein at fixed intervals for mounting positioning pins therein, respectively.

And, the beam body may be formed of a resin group material including PA6 and GF50.

Various aspects of the present invention provide for a bumper beam unit including a bumper beam having a reinforcement formed to be inserted in a beam body except both ends thereof to be exposed to an outside of the beam body and to be injection molded with a resin group material as one unit with the beam body, stays fastened to the both ends of the reinforcement respectively, and mounting plates coupled to rear ends of the stays for assembling with the vehicle body, respectively.

And, the reinforcement may include a plurality of steel pipes inserted in the beam body, and fastening plates coupled to the steel pipes at both ends thereof as one unit to be exposed to a rear side of the beam body for fastening with the stays, respectively.

And, the beam body may be formed to have a fixed curvature in a length direction thereof, and the steel pipes may be formed in conformity with the curvature of the beam body.

And, the steel pipe may be two in number, and may be pressed down before inserted in a mold and have tooling holes formed therein at fixed intervals for mounting positioning pins therein, respectively.

And, the beam body may be formed of a resin group material including PA6 and GF50.

Various aspects of the present invention provide for a method for manufacturing a bumper beam for a vehicle including manufacturing a bumper beam by injection molding a resin group material in a state a reinforcement is inserted in a mold, the reinforcement having both ends exposed to an outside of a beam body for respectively fastening to stays, and the other portions disposed in the beam body in a length direction.

And, the reinforcement may be inserted in the mold after disposing a plurality of steel pipes in parallel with one another and respectively coupling fastening plates to both ends of the steel pipes as one unit.

And, the steel pipes may be inserted in the bumper beam, and the fastening plates may be exposed to a rear side of the bumper beam for fastening the stays thereto, respectively.

And, the steel pipe may be two in number, may be pressed down before inserted in a mold and may have tooling holes formed therein at fixed intervals for mounting positioning pins therein, respectively.

And, the resin group material may include PA6 and GF50.

The bumper beam in accordance with various aspects of the present invention can improve fuel consumption by reducing whole weight of the beam while enhancing beam strength to improve crashworthiness thereof by injection molding a mold having the reinforcement which is formed for the stays to coupled thereto inserted therein with a resin group material which forms a beam body.

And, since a separate stay plate for bolting an energy absorber and the stay together can be omitted, cost and weight increase can be minimized.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
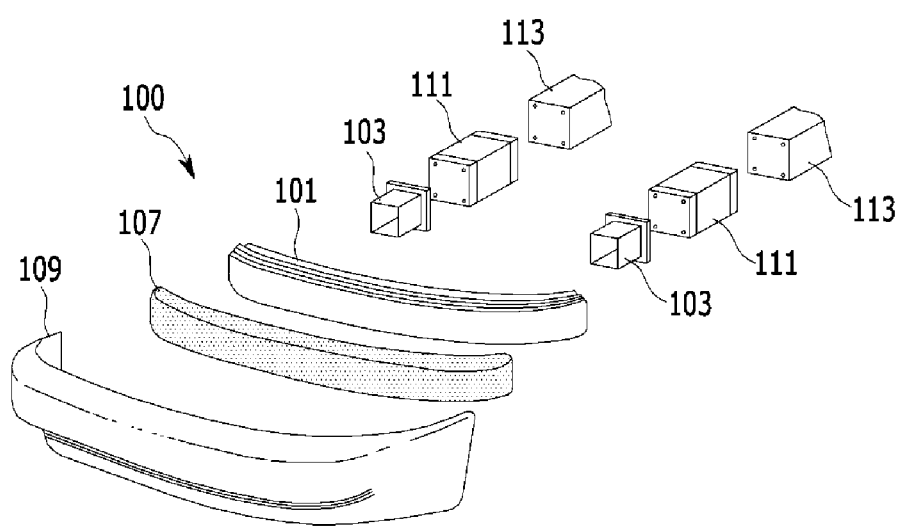
FIG. 1 illustrates an exploded perspective view of a related art bumper for a vehicle.
Figure 2:
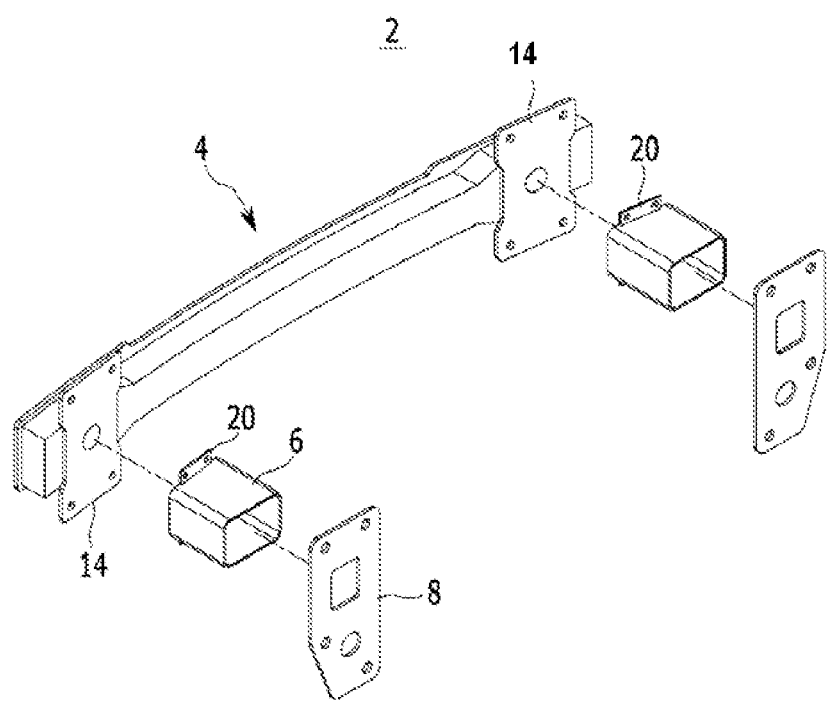
FIG. 2 illustrates an exploded perspective view of an exemplary bumper beam unit for a vehicle in accordance with the present invention.
Figure 3:
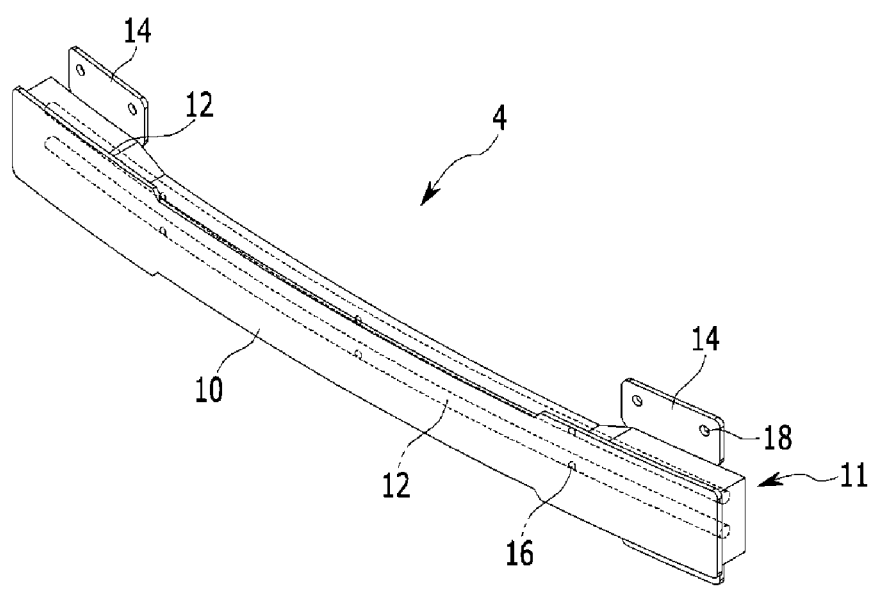
FIG. 3 illustrates a perspective view of an exemplary hybrid bumper beam for a vehicle in accordance with the present invention.
Figure 4:
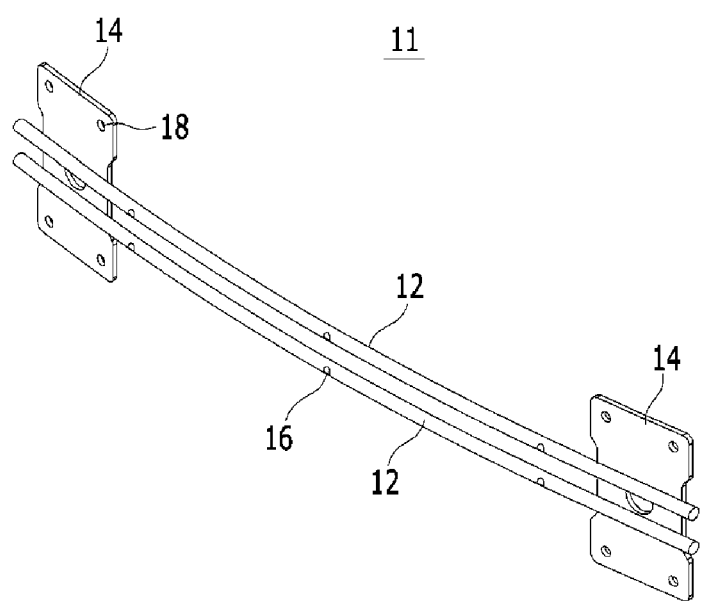
FIG. 4 illustrates a perspective view of an exemplary reinforcement in accordance with the present invention.

FIG. 2 illustrates an exploded perspective view of a bumper beam unit for a vehicle in accordance with various embodiments of the present invention, and FIG. 3 illustrates a perspective view of a hybrid bumper beam for a vehicle in accordance with various embodiments of the present invention. And, FIG. 4 illustrates a perspective view of a reinforcement in accordance with various embodiments of the present invention, and FIG. 5 illustrates a cross sectional side view of a bumper beam for a vehicle in accordance with various embodiments of the present invention.

The bumper beam unit 2 for a vehicle in accordance with various embodiments of the present invention includes a hybrid bumper beam 4, two stays 6, and two sheets of mounting plates 8.

Figure 5:
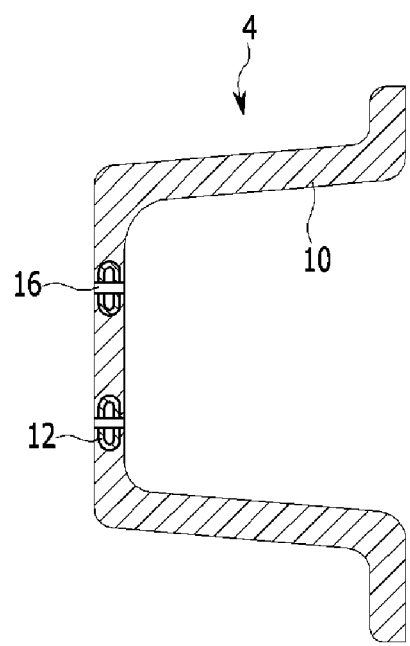
FIG. 5 illustrates a cross sectional side view of an exemplary bumper beam for a vehicle in accordance with the present invention.

Referring to FIGS. 3 and 5, the hybrid bumper beam 4 in accordance with various embodiments of the present invention is injection molding of a resin group material in a state that a reinforcement 11 is inserted in situ into a mold to form an integral one or single unit for reducing whole weight of the beam while enhancing strength of the beam to improve crashworthiness.

The hybrid bumper beam 4 in accordance with various embodiments of the present invention is manufactured with steps of forming reinforcement 11, inserting the reinforcement 11 in a mold, and injecting a resin group material to the mold to make injection molding.

Referring to FIG. 4, the reinforcement 11 inserted in a beam body 10 in accordance with various embodiments of the present invention is a reinforcing member for reinforcing crush stiffness of the hybrid bumper beam 4 of a resin group material.

The reinforcement 11, the reinforcing member of the hybrid bumper beam 4, is constructed by coupling fastening plates 14 to both ends of elongated members, for example, steel pipes 12.

The steel pipe 12 may be provided in plural and disposed at fixed intervals in the beam body 10. Various embodiments of the present invention may include the two steel pipes 12 disposed in a length direction of the beam body 10 in an up/down direction parallel to each other with a gap therebetween.

The gap between the steel pipes 12 may be set taking a width of the beam body 10 into account.

The steel pipes 12 are configured to be bent in conformity with a curvature of the beam body 10, and each of the steel pipes 12 may be pressed down to have an oval cross section so as to be inserted in the beam body 10 easily.

And, in order to prevent positions of the steel pipes 12 from moving at the time of injection of the resin group material into the mold, tooling holes 16 may be formed at fixed intervals in the steel pipes 12.

As positioning pins are placed in the tooling holes 16 in the steel pipes 12, the positions of the steel pipes 12 are secured during the resin group material is injected into the mold and the injection molding is done.

And, the fastening plates 14 are coupled to the both ends of the two steel pipes 12 disposed thus for mounting the stays 6 thereto, respectively.

The fastening plate 14 is rectangular substantially, and has fastening holes 18 formed therein for fastening the stay 6 thereto.

The fastening plate 14 may be welded to the steel pipes 12 with $CO_2$ welding as one unit.

Various embodiments of the present invention may include inserting the fastening plates 14 and the steel pipes 12 in the mold in a state the fastening plate 14 and the steel pipes 12 are welded as one unit thus, and injection molding the mold with the fastening plates 14 and the steel pipes 12 inserted therein thus together with the resin group material as one unit to form the hybrid bumper beam 4 which is stiffer than before.

In this case, though the steel pipe 12 is inserted in the hybrid bumper beam 4, the fastening plate 14 is disposed to be exposed to a rear side of the hybrid bumper beam 4.

The resin group material to be injected into the mold may include PA6 and GF50.

The beam body 10 injection molded with the resin group material including the PA6 and GF50 thus has lightweight and excellent impact absorbing performance.

And, since the beam body 10 serves as an energy absorber, the energy absorber may be omitted.

The stays 6 are fastened to the fastening plates 14 at the both ends of the hybrid bumper beam 4 fabricated thus, respectively.

The stay 6 may be assembled to the fastening plate 14 as a mounting end 20 extended from an upper side of a front end of the stay 6 is fastened to the fastening plate 14 with bolts.

And, the mounting plates 8 which will be assembled with the vehicle body are coupled to the stays 6 at rear ends thereof, respectively.

The mounting plates 8 are welded to the rear ends of the stays 6 to enable to assemble the stays 6 with side members of the vehicle body, respectively.

For convenience in explanation and accurate definition in the appended claims, the terms upper, front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid bumper beam for a vehicle comprising:
a beam body formed of an injection-molded resin-group material; and
a reinforcement extending within the beam body, the reinforcement including an elongated member extending within the beam body along a length direction of the beam body having opposing ends protruding outside of the beam body for fastening to stays, respectively,
wherein the reinforcement includes:
a plurality of steel pipes inserted in the beam body; and
fastening plates coupled to the steel pipes at the opposing ends thereof as one unit exposed to a rear side of the beam body for fastening to the stays, respectively, and
wherein the steel pipes are two in number, are pressed down and deformed in cross-section thereof before inserted in a mold and have tooling holes formed therein at fixed intervals for mounting positioning pins therein to prevent movement of the steel pipes during injection molding of the resin, respectively.

2. The hybrid bumper beam of claim 1, wherein the beam body is formed to have a fixed curvature in a length direction thereof, and the steel pipes are formed in conformity with the curvature of the beam body.

3. The hybrid bumper beam of claim 1, wherein the beam body is formed of a resin group material including PA6 and GF50.

4. A bumper beam unit for a vehicle comprising:
a bumper beam formed of an injection-molded resin-group material including a reinforcement having an elongated member extending within a beam body and having opposing ends protruding outside of the beam body;
stays fastened to the opposing ends of the reinforcement, respectively; and
mounting plates coupled to rear ends of the stays for assembling with a vehicle body, respectively,
wherein the reinforcement includes;
a plurality of steel pipes inserted in the beam body, and
fastening plates coupled to the steel pipes at the opposing ends thereof as one unit to be exposed to a rear side of the beam body for fastening with the stays, respectively, and
wherein the steel pipes are two in number, are pressed down and deformed in cross-section thereof before inserted in a mold and have tooling holes formed therein at fixed intervals for mounting positioning pins therein to prevent movement of the steel pipes during injection molding of the resin, respectively.

5. The bumper beam unit of claim 4, wherein the beam body is formed to have a fixed curvature in a length direction thereof, and the steel pipes are formed in conformity with the curvature of the beam body.

6. The bumper beam unit of claim 4, wherein the beam body is formed of a resin group material including PA6 and GF50.

7. A method for manufacturing a bumper beam for a vehicle comprising:
forming an injection-molded bumper beam in situ around a reinforcement inserted in a mold, wherein the bumper beam includes a beam body formed of resin group material, wherein the reinforcement includes an elongated member extending within the beam body in a length direction of the beam body, and includes opposing ends extending outside of the beam body for respectively fastening to stays,
wherein the reinforcement is inserted in the mold after disposing a plurality of steel pipes in parallel with one another and respectively coupling fastening plates to opposing ends of the steel pipes as one unit, and
wherein the steel pipes are two in number, are pressed down and deformed in cross-section thereof before inserted in a mold and have tooling holes formed therein at fixed intervals for mounting positioning pins therein to prevent movement of the steel pipes during injection molding of the resin, respectively.

8. The method of claim 7, wherein the steel pipes are inserted in the bumper beam, and
the fastening plates are exposed to a rear side of the bumper beam for fastening the stays thereto, respectively.

9. The method of claim 7, wherein the resin group material includes PA6 and GF50.

* * * * *